Figure 1:
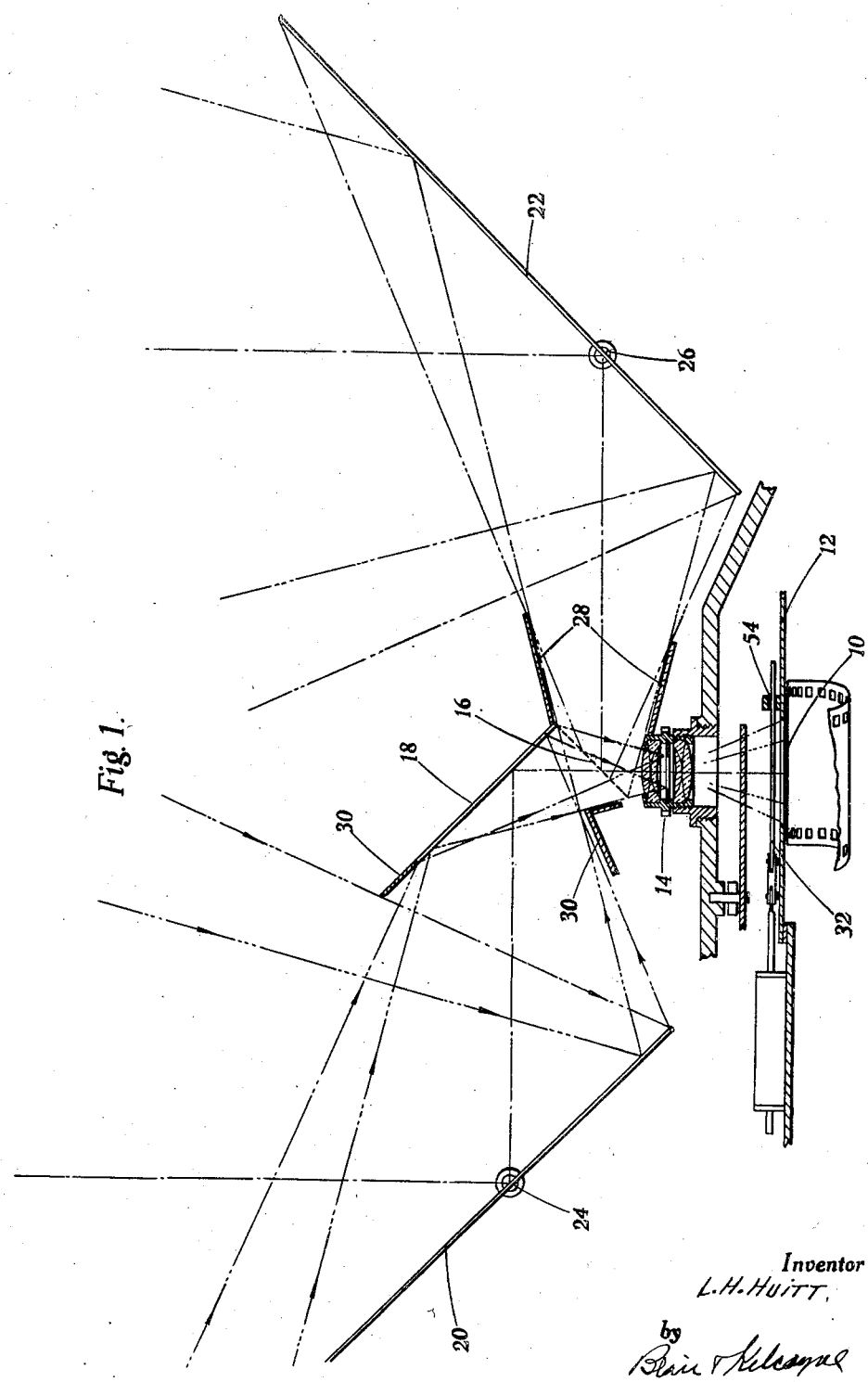

April 29, 1941.　　　L. H. HUITT　　　2,240,398
CINEMATOGRAPHY
Filed April 21, 1939　　　5 Sheets-Sheet 2

Inventor
L. H. HUITT
by
Attorneys

April 29, 1941.  L. H. HUITT  2,240,398
CINEMATOGRAPHY
Filed April 21, 1939  5 Sheets-Sheet 5

INVENTOR
L. H. HUITT
BY
ATTORNEY

Patented Apr. 29, 1941

2,240,398

UNITED STATES PATENT OFFICE 2,240,398

CINEMATOGRAPHY

Lionel Hubert Huitt, Rangoon, Burma, British India

Application April 21, 1939, Serial No. 269,230
In Great Britain June 28, 1938

16 Claims. (Cl. 88—16.6)

This invention relates to improvements in the taking of cinematograph pictures and the invention aims at the production of cinematograph pictures in which the attention of the audience is directed automatically to the part of the scene to which at any time the producer desires it to be directed, this part possessing properties in relation to the whole such that, when the audiences' gaze is directed thereto, the whole gives rise to binocular impressions of depth and space.

According to the present invention, the definition of the photographic image is caused to vary in somewhat the same manner as the definition of the image on the retina of the human eye, that is to say, in such a way that there is a small area of good definition corresponding in angular diameter to the fovea centralis of the eye, the remaining part of the field of view becoming progressively less well defined in proportion to the distance from the area of good definition, which will hereinafter be referred to for convenience as the "foveal area," and means under the control of the operator are provided whereby he can move the foveal area to any part of the photographic field at will.

Preferably the illumination of the photographic field of view also diminishes radially outwards from the foveal area.

Preferably, also, the photographic field of view registered on the film frame is formed by superimposing, one over the other, two images of the scene being photographed, taken from two view points spaced apart horizontally, and means are provided under the control of the operator whereby he can cause the two images of any object in the view to come into coincidence. The movement of the foveal area and the adjustment of coincidence of the two images are preferably effected during the taking of the pictures, a single film being used and the two images being superimposed on this film by means of reflecting surfaces. It would be within the invention to expose two separate cinematograph sequences, not superimposed, the view points of these sequences being spaced apart horizontally and to make the aforesaid adjustments during a copying operation in which the two sequences are superimposed on a single film. Conveniently, the means for effecting the adjustment for coincidence, which will hereinafter be referred to as the "converging means," are interconnected with the focussing device. Thus, the operator need only focus upon that part of the scene which is at any moment within the foveal area and the two images of that part will then always coincide.

In carrying out the invention in its preferred form, the camera operator moves the foveal area from place to place in the photographic field of view, making its centre follow in general the point of major interest in the scene, at the same time maintaining this point in sharp focus and single-image coincidence. The rest of the field will be ill-defined in proportion to the distance from the foveal area and may also be less well illumined. Also, as various parts of the scene are at different distances from the lens, only those objects which happen to lie in one particular plane will be in sharp focus and single image coincidence, and therefore the major part of the remainder of the items in the field will be additionally indistinct owing to being out of focus and possessing doubled images.

Thus the spectator, when viewing the projected film, will automatically direct his eyes towards the foveal area portrayed on the screen, as this will be the only part of the picture having sharp focus, single image definition and maximum illumination. His attention will be thereby concentrated on that point of interest in the scene which had been selected by the operator and which had been the determining factor in guiding the operator's manipulation of the focussing and converging mechanism of the camera.

It is to be understood that the two images taken from different viewpoints do not produce a stereoscopic effect properly so-called because both eyes of the spectator see both images, whereas to obtain a true stereoscopic effect the left eye should see only the image taken from the left-hand point of view and the right eye should see only the image taken from the right-hand point of view. The doubling of the picture outside the foveal area, however, enhances the directive effect towards the foveal area and it also gives an impression of "depth" or varying distance from the observer.

In order to produce two superimposed pictures on the film taken from two viewpoints spaced apart, reflecting devices generally similar to those employed in two-colour cinematography and in certain kinds of stereoscopic cinematography may be employed.

Referring to the accompanying drawings—

Figure 2:
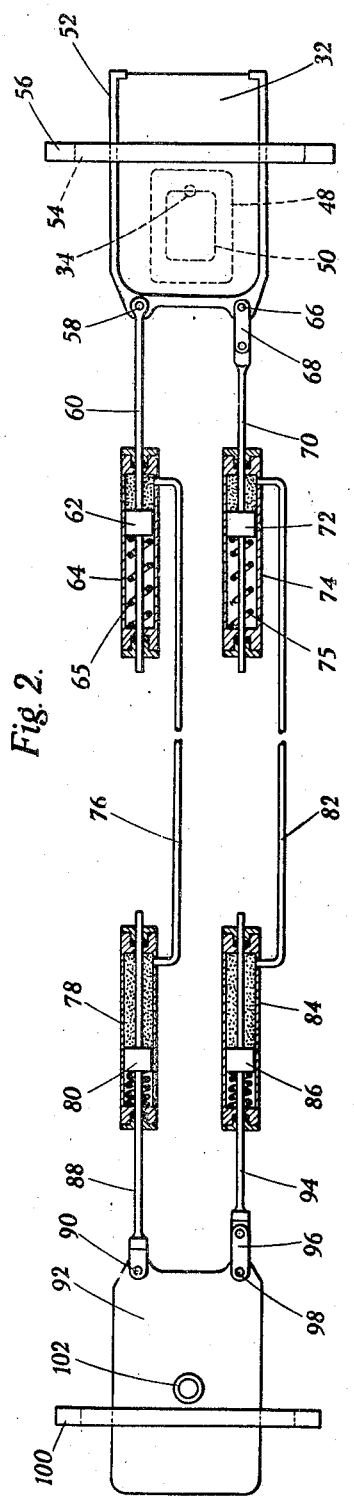
Figure 4:
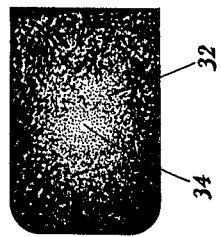
Figure 3:
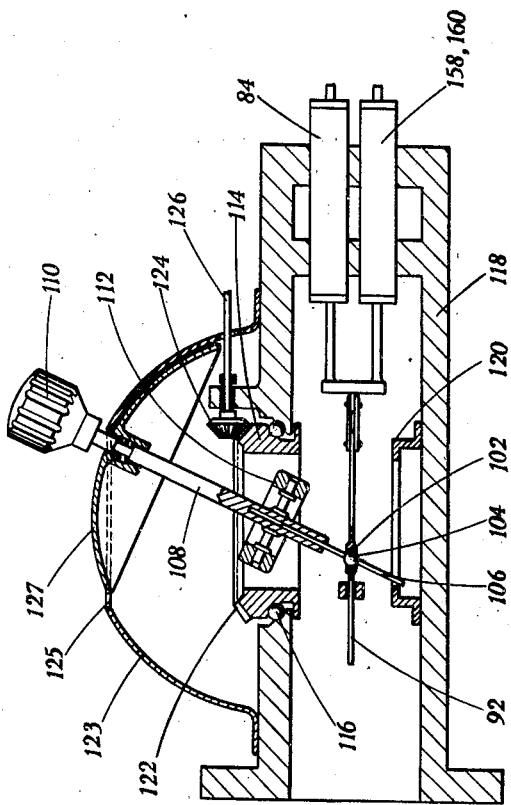
Figure 5:
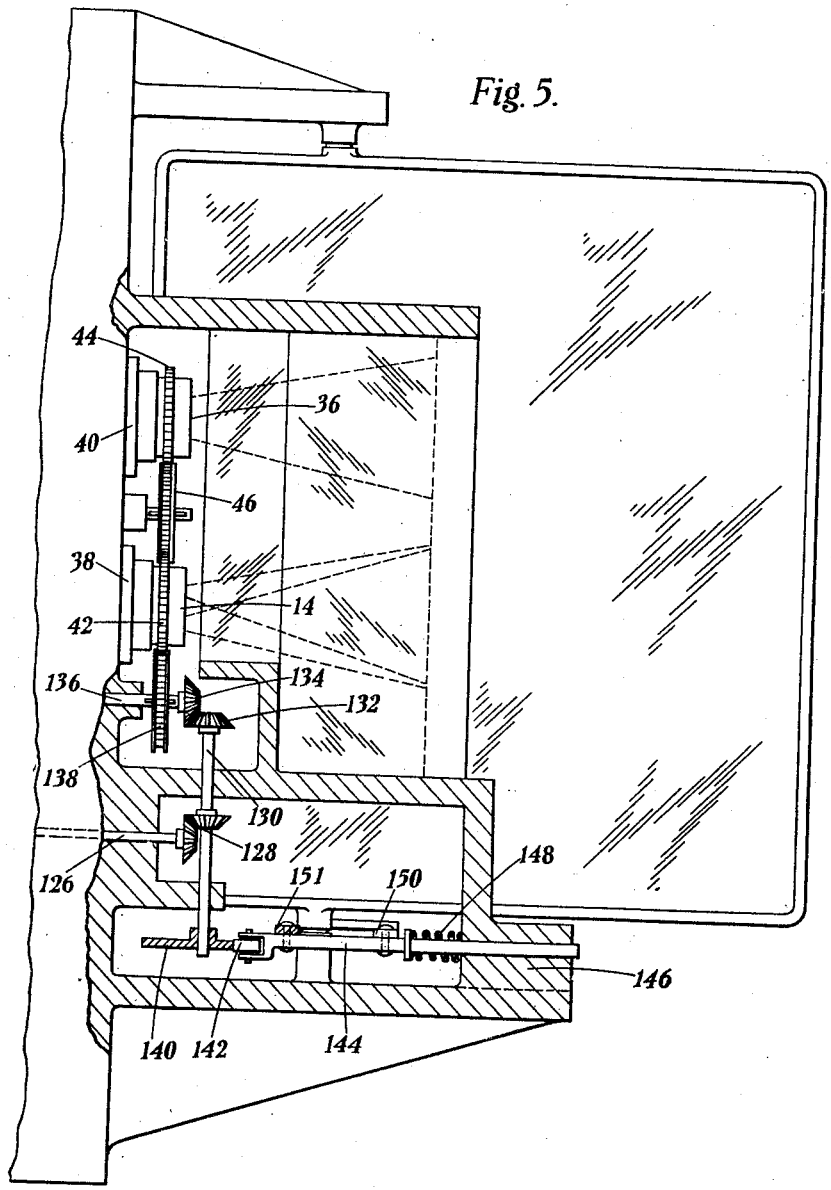
Figure 6:
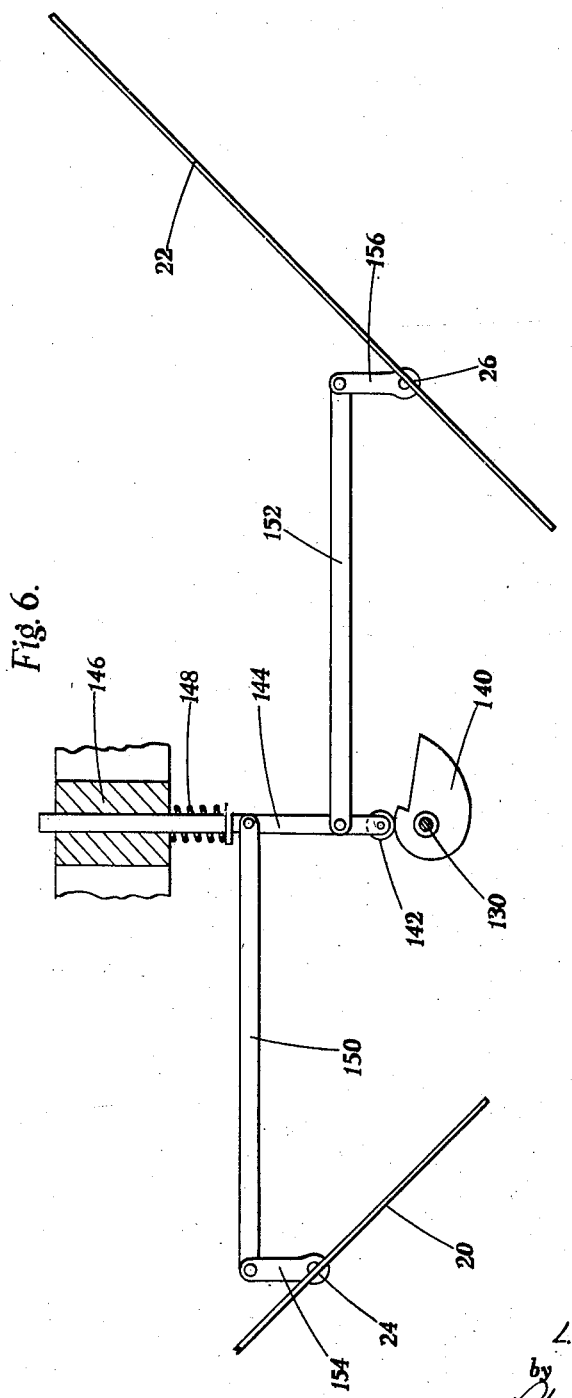
Figure 7:
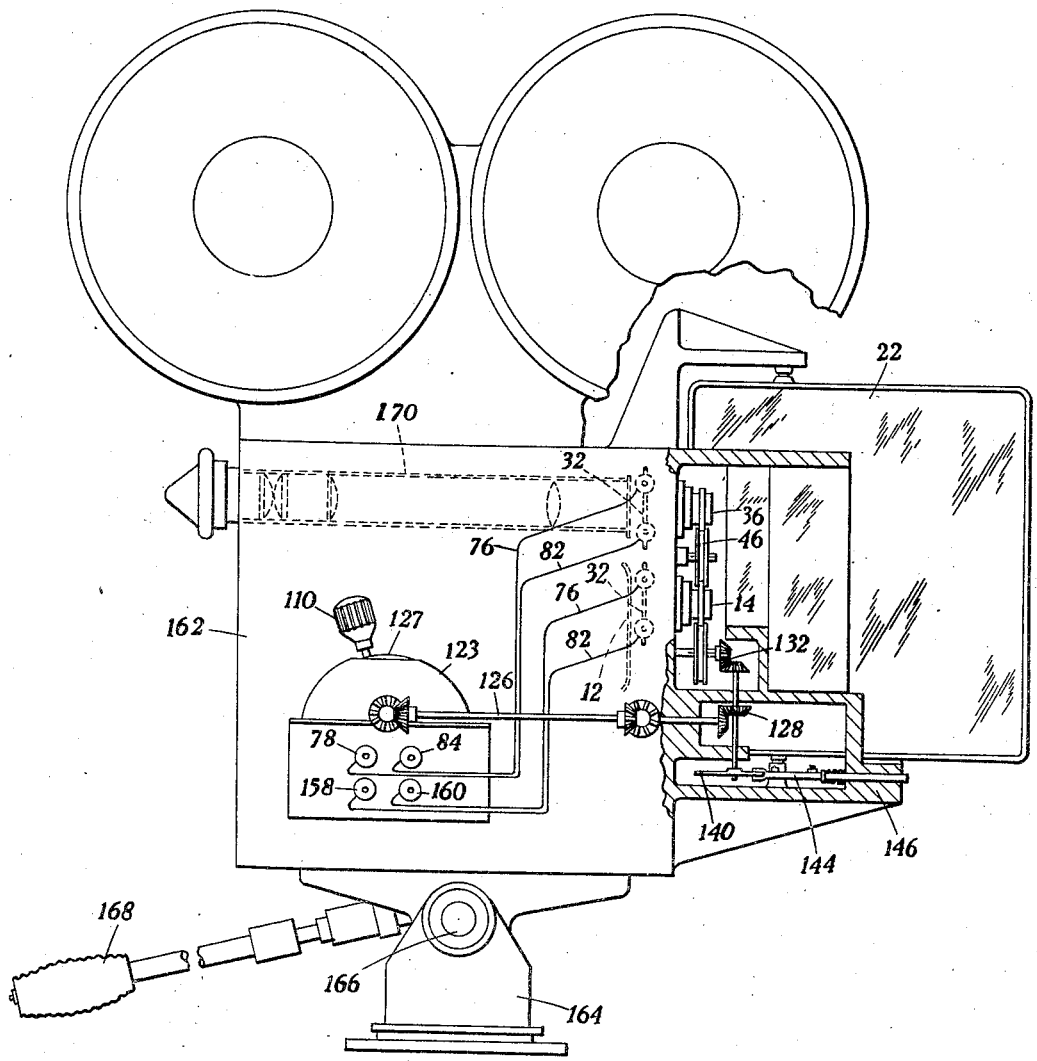

Figure 1 is a diagram in plan of a cinematograph camera according to this invention, Figures 2 and 3 represent devices whereby the foveal area may be moved to any part of the picture area, Figure 4 is a representation of the screen employed in obtaining the foveal area, Figure 5 is a side elevation in section corresponding to Figure 1, Figure 6 is a view similar to Figure 1 showing mechanism omitted from that figure, and Figure 7 is a diagrammatic representation in side elevation of a complete cinematograph camera embodying the present invention.

Referring to Figure 1, 10 represents the film which moves in the film gate 12 in the focal plane of the lens 14. In front of this lens is a transparent membrane 16 which has a thin reflecting layer of metal on its surface, this layer being sufficiently thin to transmit and reflect equal quantities of light. This membrane is inclined at 45° to the optical axis of the lens. In front of it is a mirror 18 which is fully reflecting and opaque. It is inclined at an angle of 45° to the optical axis but in the opposite direction and it receives light from another mirror 20 which is normally parallel to it. The light from the scene being taken is reflected from the surface of the mirror 20, then from the surface of the mirror 18 and passes into the lens after traversing the membrane 16. To the right of the membrane 16 is a further mirror 22 normally parallel thereto. This reflects light onto the surface of the membrane 16 which reflects a part of it into the lens. Thus, two images are formed in superimposition on the film 12, these images being as seen from viewpoints spaced apart in the horizontal direction, that is to say, from the points 24, 26 where the axial rays intersect the mirrors 20, 22 respectively. These two mirrors are pivoted about vertical axes passing through the points 24, 26, so that by tilting these two mirrors, rays from a point at any desired distance from the camera, after dividing and traversing the alternative optical paths, can be brought together again to form a single-point image on the film. Thus, when the two mirrors are in the position shown, parallel respectively to the reflecting surfaces 18, 16, the two images of objects at infinity are in coincidence on the film. If it is desired to bring into coincidence the images of points at any finite distance the mirror 20 is turned in the clockwise direction and the mirror 22 is turned the same amount in the anticlockwise direction.

Hoods 28, 30 are provided which vignette the margin of the image so that a central area is fully illuminated, but outside this central area the illumination falls away to zero at the edge of the frame. It is intended that when the pictures are projected the central fully illuminated area shall occupy the whole of the normal screen, and the vignetted margin shall be received on an extension surrounding the normal screen.

Immediately in front of the film 10 is a movable screen 32 which is shown also in Figure 4. The screen is of transparent material and the small area 34 is clear so that the light passes through it without diffusion or distortion. The remainder of the screen is light diffusing in proportion to the radial distance from the clear area, and in Figure 4 the degree of light-diffusing capacity is represented by the density of the shading. The screen may be rendered light-diffusing by frosting it, for example by etching. Conveniently its whole surface is initially ground or etched, the clear area being produced by polishing, the remainder of the surface being less and less perfectly polished in proportion to the distance from the completely polished area 34. The diffusion of the light passing through the ground or etched part of the screen produces a fogged effect in the image. Alternatively, the surface of the screen may be made wavy or corrugated, the depths of the corrugations increasing gradually outwards from the central plane parallel area. In this case the screen is preferably placed further away from the film than is shown in Figure 1. The waves or corrugations produce a softening of the definition similar to that produced by mal-focus of the lens.

The screen may also vary in transparency, the central area 34 being clear and the remainder becoming more opaque towards the margins. Thus, the screen produces a foveal area which is well-defined and brightly illuminated, surrounded by an area which becomes progressively more diffused or ill-defined and less well illuminated in proportion to the distance from the foveal area.

Referring to Figure 5, a second lens 36 is provided above the camera lens 14, this second lens being for the view-finder. As shown in this figure, the mirrors 16, 18, 20 and 22 are made large enough to supply both lenses with light. The superimposed images on the view-finder screen will therefore be identical with those on the film, except for very slight vertical parallax effects. A second screen 32 is mounted in front of the view-finder screen and the two screens 32 are connected together and to an actuating knob, in a manner which will be described later, so that both screens can be moved in any direction to the same extent.

Both lenses are focussed by screwing them into and out of their mounts 38, 40. Each lens is provided with gear teeth 42, 44 which mesh with a shrouded idler gearwheel 46. Thus, when one of the lenses is rotated for focussing the other lens is rotated to the same extent, so that the focussing of the image on the film is always the same as that of the image on the view-finder screen.

Referring now to Figure 2, the outline of the film gate or frame is indicated by the dotted rectangle 48 and the outline of the central fully-illuminated area is indicated by the dotted rectangle 50, the marginal space between these two rectangles being the vignetted area. The screen 32 is shown held in a frame 52 which, as shown also in Figure 1, is free to move in all directions in the plane of the screen in a slot 54 formed in a bar 56 fixed to the film gate 12. The frame 52 is pivoted at 58 to a piston rod 60 fixed to a piston 62 sliding in a cylinder 64. At 66 the frame is connected by a link 68 to another piston rod 70 fixed to a piston 72 sliding in a cylinder 74. Both pistons are urged to the right by springs 65, 75 respectively.

The space in each cylinder to the right of the piston is filled with liquid. This part of the cylinder 64 is connected by a pipe 76 to a cylinder 78 similar in all respects to the cylinder 64 and containing a piston 80 spring-pressed towards the right. The cylinder 74 is similarly connected by a pipe 82 to a cylinder 84 containing a piston 86. The rod 88 of the piston 80 is pivoted at 90 to an actuating plate 92 and the rod 94 of the piston 86 is connected by a link 96 to a point 98 on the actuating plate. The points 90, 98 correspond in position on the plate 92 to the points 58, 66 on the frame 52. It will be appreciated that if the plate 92, guided by a slot in a bar 100, is moved in any direction the frame 52 will be moved in the opposite direction. If, for example, the plate is moved to the right liquid will be transferred from both cylinders 70, 84 to the cylinders 64, 74 respectively, with the result that the frame 52 will move to the left. The plate 92 cannot move bodily up and down but if its centre is moved upwards the plate will pivot about the point 90. The piston 80 will therefore not move, but the piston 86 will move to the left, thereby transferring liquid from the cylinder 74 to the cylinder 84. The frame 52 will therefore be swung about the point 58 so that the foveal area 34 of the screen 32 will move in an arcuate path identical with the arcuate path described by the centre of the plate 92, but in the opposite direction.

Referring now to Figure 3, a socket 102 is formed in the centre of the plate 92, or rather at the points corresponding in position to the foveal area 34 on the screen 32. In this socket is a ball 104 carried by a rod 106 which slides in a bore in a lever 108 provided with a hand knob 110. The lever 108 is connected by a universal joint, the gimbal ring of which is indicated at 112, to a rotatable ring 114 carried in a ball bearing 116 in a frame 118 which also carries the cylinders 78, 84. The lower end of the rod 106 moves inside a rectangular frame 120 which limits its movement in all directions. The size and shape of this frame 120 is such that the centre of the ball 104 cannot move beyond the confines of a rectangle equal in size and shape to the rectangle 50. It results that the foveal area 34 can be moved to any point within the fully illuminated area of the film, but cannot occupy a position anywhere in the vignetted margin.

The ring 114 is provided with bevel gear teeth 122 meshing with a bevel pinion 124 connected by a shaft 126 through bevel gearing 128 to a vertical shaft 130. The bevel wheel 132 fixed to the upper end of the shaft meshes with another bevel gear 134 attached to a spindle 136 to which is splined a shrouded gearwheel 138 meshing with the gearwheel 42. In this way the lenses 14, 36 can be focussed by rotating the knob 110. A cam 140 fixed to the lower end of the shaft 120 (see also Figure 6) co-operates with a cam follower roller 142 carried by a rod 144 sliding in a guide 146, a spring 148 maintaining the follower in contact with the cam. The rod 144 is connected by links 150, 152 to arms 154, 156 respectively. The arm 154 is rigidly attached to the mirror 20 and the arm 156 is rigidly attached to the mirror 22. When the cam 140 is rotated clockwise as seen in Figure 6 the mirror 20 is turned in a clockwise direction and the mirror 22 in the anticlockwise direction, and the cam is so shaped that the convergence between the two optical axes suits the focussing—that is to say, an object which is in sharp focus will have its two images in coincidence on the film.

Referring to Figure 3, a second pair of cylinders 158, 160 similar to the cylinders 78, 84 is employed for actuating the screen 32 in the view-finder. The operating mechanism for this view-finder screen is a duplicate of that described with reference to Figure 2.

In using the camera the operator watches the images on the view-finder screen and manipulates the knob 110. By swinging this in various directions he can move the foveal area 34 to any part of the fully illuminated area of the picture and at the same time by turning the knob he can focus the lenses upon the part of the subject occupying the foveal area. The focussing movement swings the mirrors 20, 22 to bring the images of the object focussed upon automatically into coincidence.

The ring 122 is surmounted by a hemispherical cover 123 having an opening 125 which is closed by a disc 127 attached to the lever 108, this disc being curved to the same curvature as the cover 123 and moving freely inside the cover.

The way in which the elements of the invention cooperate is illustrated in Figure 7 which shows in side elevation a cinematograph camera, the camera back 162 of which is mounted on a rotatable tripod head 164 in pivots 166, a handle 168 being provided so that the camera may be directed to any desired point. The view finder is indicated at 170 and the two movable screens 32 are shown, one in front of the view-finder screen and the other in front of the film gate 12 and both jointly under the control of the hand-knob 110, the movement of which also controls the focussing of the lenses 14, 36 through the gearing 128, 132 and also the adjustment of the mirrors 20, 22 by means of the cam 140.

The view-finder is not shown in detail but it may be of any suitable kind with provision for erecting the image. The optical axis of the view-finder may be "bent" or staggered by means of prisms or mirrors so that the view-finding systems clear the internal mechanism of the camera. It may also be corrected for parallax by any of the well-known methods. The screen 32, and the corresponding screen in the view-finder, may be made interchangeable with other screens having different characteristics, for example different diameter of foveal circle of a different gradation of diffusion and different gradation of transparency. Alternatively, the effect of the screens may be varied by varying the distance between them and the film in the one case and the focussing screen of the view-finder in the other case.

It will be appreciated that the invention may be applied to television cameras as well as to photographic cameras and the expression "cinematograph" is to be interpreted as including television.

I claim:

1. In a cinematographic camera, the combination of means for supporting a sensitive image-receiving surface, means for forming an image on the surface, a movable screen operative to pass undiffused light to a selected small area of the image-receiving surface and to pass the light to other parts of said surface which is diffused in proportion to the radial distance outwardly from said small area whereby to provide a small area of good image definition around which the image becomes progressively less well-defined, and means for moving said screen in any direction at will transversely to the optical axis of the image forming means whereby a desired point or part of said image may be well-defined in relation to the remainder thereof.

2. In a cinematographic camera, the combination of means for supporting a sensitive image-receiving surface, means for forming on said surface two superimposed images of an object or scene taken from viewpoints spaced horizontally, a movable screen operative to pass undiffused light to a selected small area of said surface and to pass the light to other parts of said surface which is diffused in proportion to the radial distance outwards from said small area, whereby to provide a small area of good image definition around which the image becomes progressively less well-defined, means for bringing into coincidence at the image plane the portion of the superimposed images occuping said small area of good definition, and means for moving said screen whereby a desired point or part of the superimposed images may be well-defined in relation to the remainder thereof.

3. A cinematographic camera as claimed in claim 2, wherein the camera is provided with a view finding device including an image-receiving surface, means for forming on said last surface two superimposed images corresponding to those formed on the sensitive image-receiving surface, means for bringing into coincidence said last-named images, mechanism interconnecting both said means for bringing the superimposed images into coincidence and providing for the working of said means in synchronism, a screen similar to the first screen and associated with said view finding device, connections operative between said screens and providing for movement thereof in synchronism, and mechanism interconnecting both said means for forming the superimposed images and effecting the working thereof in synchronism whereby at any instant the composite image formed on the view finder image-receiving surface is substantially similar to that being formed at the image plane of the sensitive image-receiving surface.

4. A cinematographic camera as claimed in claim 2, wherein the camera is provided with a view finding device including an image-receiving surface, means for forming on said last surface two superimposed images corresponding to those formed on the sensitive image-receiving surface, means for bringing into coincidence said last-named images, mechanism interconnecting both said means for bringing the superimposed images into coincidence and providing for the working of said means in synchronism, a screen similar to the first screen and associated with said view finding device, connections operative between said screens and providing for movement thereof in synchronism, and mechanism interconnecting both said means for forming the superimposed images and effecting the working thereof in synchronism whereby at any instant the composite image formed on the view finder image-receiving surface is substantially similar to that being formed at the image plane of the sensitive image-receiving surface, and wherein the camera is further provided with focusing means and mechanism interconnecting said focusing means and both said means for bringing the superimposed images into coincidence, whereby the parts of the images which are in coincidence are also in sharp focus.

5. A cinematographic camera as claimed in claim 2, wherein the means for forming the superimposed images on the sensitive surface includes a camera lens, two plane mirrors one on either side of said lens and inclined at an angle to reflect light from the scene in a direction at right angles to the optical axis of the lens, a third mirror having a semi-transparent reflecting coating arranged in front of the lens so as to reflect into the lens light which it receives from one said plane mirrors, and a fourth mirror in front of the third mirror arranged to receive light from the other of the plane mirrors and reflecting through the semi-transparent coating into the camera lens.

6. In a cinematographic camera, the combination of means for forming on a sensitive image-receiving surface two superimposed images of an object or scene taken from viewpoints spaced horizontally, said means including a camera lens and a system of reflecting mirrors for reflecting light into said lens, a view finder device including a lens arranged vertically in line with the camera lens and an image-receiving surface, means including said system of reflecting mirrors for forming on said last surface two superimposed images corresponding to those being formed on the sensitive image-receiving surface, a movable screen operative to pass to a selected small area of the sensitive surface a portion of the light reflected into the camera lens and without diffusion thereof and to pass the light to other parts of said surface which is diffused in proportion to the radial distance outwards from said small area whereby to provide a small area of good image definition, a second screen similar to the first screen through which light reflected into the view finder lens is passed to the image-receiving surface of the view finder, means for moving said screens in unison, and means for bringing into coincidence the superimposed images at the image planes of the sensitive surface and of the view finder, respectively, whereby the composite image formed on the view finder image-receiving surface is substantially similar to that being formed on the sensitive surface, both with regard to the position of the small area of good image definition and the coincident images.

7. A cinematographic camera as claimed in claim 6, wherein the system of reflecting mirrors includes two plane mirrors one on either side of the camera lens and inclined at an angle to reflect light from the scene in a direction at right angles to the optical axis of the camera lens, said two mirrors being pivoted to turn about vertical axes, and means interconnecting said two mirrors and providing for their rotation always in opposite directions to the same extent.

8. A cinematographic camera as claimed in claim 6, wherein the system of reflecting mirrors includes two plane mirrors each pivoted to turn about a vertical axis and means interconnecting said mirrors and providing for their rotation in opposite directions and to the same extent, and wherein the camera and view finder lenses are each provided with a focusing device, together with mechanism for interconnecting said focusing devices with the means for rotating the mirrors.

9. A cinematographic camera as claimed in claim 6, wherein the system of reflecting mirrors includes two plane mirrors each pivoted to turn about a vertical axis and means interconnecting said mirrors and providing for their rotation in opposite directions and to the same extent, and wherein the camera and view finder lenses are each provided with a focusing device, together with mechanism for interconnecting said focusing devices with the means for rotating the mirrors, and wherein a single actuating means is connected to the means for moving the screens and to the interconnected focusing device and mirror rotating means, said actuating device being operable upon movement of one character to actuate the movable screens in unison and upon movement of another character to actuate the focusing and mirror rotating means.

10. A cinematographic camera as claimed in claim 1, wherein are provided means for vignetting the marginal portion of the image formed on the sensitive receiving surface, and means for limiting the movement of the screen and operative to prevent movement of the area of good image definition on to the vignetted marginal part.

11. In a cinematographic camera, the combination of means for supporting a sensitive image-receiving surface, means for forming an image on the surface, a movable screen disposed immediately in front of said surface and having a small non-diffusing and non-absorbing area for passing undiffused light to a selected small area of the image-receiving surface, the remainder of the screen being progressively light-diffusing and light absorbing to a greater extent outwardly of said small area, thereby to provide a small area of good image definition around which the image becomes progressively less well-defined, and means for moving said screen in any direction at will transversely to the optical axis of the image forming means whereby any desired point of said image may be well-defined in relation to the remainder thereof.

12. The combination of a camera for forming the image of an object or scene on a sensitive image-receiving surface, a view finder including means for erecting an image which is substantially similar to the image being formed on the sensitive surface, a foveal screen in the field of view of each, manual control means, and means interconnecting said control means and screens and providing for like movement of said screens.

13. The combination of a camera including means for forming a plurality of superimposed images of an object or scene on a sensitive image-receiving surface, a lens system, means for focussing the lens of said system, and coincidence adjusting means for bringing the superimposed images into coincidence, a view finder for forming an image which is substantially identical with the image being formed on the sensitive surface and including a lens system and means for focussing the lens thereof, a foveal screen in the field of view of each said camera and view finder, means interconnecting said screens and providing for their like movements, and means interlocking the camera and view finder focussing means with each other and with the coincidence adjusting means.

14. The combination of a camera for forming the image of an object or scene on a sensitive image-receiving surface, a view finder including means for forming an image which is substantially identical with the image being formed on the sensitive surface, a foveal screen in the field of view of each, means interconnecting said screens, and a single control means operative through said interconnecting means for providing like movements of said screens.

15. The combination of a camera including means for forming a plurality of superimposed images on a sensitive image-receiving surface, a lens system, means for focusing the lens of said system, and coincidence adjusting means for bringing the superimposed images into coincidence, a view finder for forming an image which is substantially identical with the image being formed on the sensitive surface and including a lens system and means for focussing the lens thereof, a foveal screen for each said camera and lens finder, means interconnecting said screens, means interconnecting the camera and view finder focussing means with each other and with the coincidence adjusting means, and a single control means operative through both said interconnecting means for effecting focussing and coincidence adjustments and for actuating said screens in unison.

16. In a camera having means for forming an image of an object or scene on a sensitive image-receiving surface, a foveal screen disposed immediately in front of the image-receiving surface, and means for moving the screen in any direction at will transversely to the optical axis of the image forming means including provisions for bringing the foveal area of the screen to any selected point of interest of the image in rapid and accurate manner.

L. H. HUITT.